A. BUCKLEY.
Horse-Detacher.
No. 219,145. Patented Sept. 2, 1879
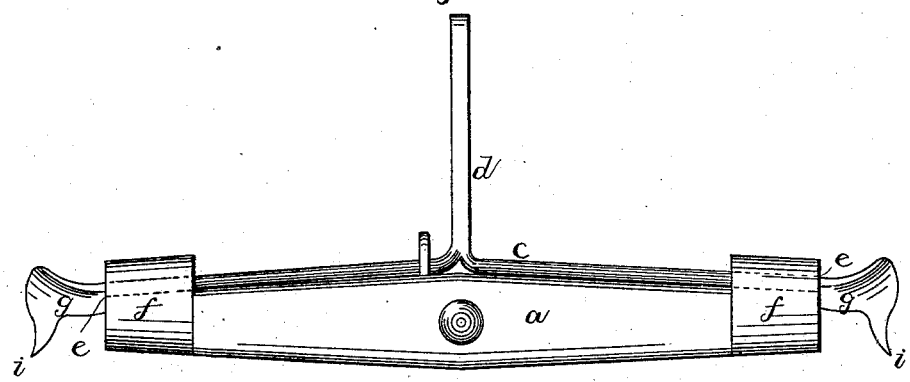
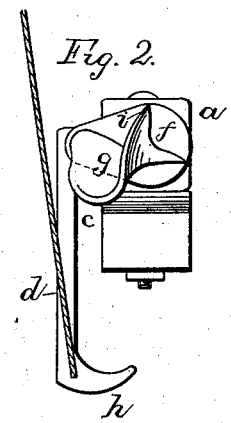

UNITED STATES PATENT OFFICE.

ANDREW BUCKLEY, OF SLICKAWAY, KENTUCKY.

IMPROVEMENT IN HORSE-DETACHERS.

Specification forming part of Letters Patent No. 219,145, dated September 2, 1879; application filed March 28, 1879.

*To all whom it may concern:*

Be it known that I, ANDREW BUCKLEY, of Slickaway, in the county of Fayette and State of Kentucky, have invented certain new and useful Improvements in Horse-Detachers; and I do hereby declare the following to be a full, clear, and exact description of the invention, such as will enable others skilled in the art to which it pertains to make and use it, reference being had to the accompanying drawings, which form part of this specification.

My invention relates to an improvement in horse-detachers; and it consists in forming upon each end of the detaching-rod an auger-shaped catch for the end of the trace to fasten on, so that whenever it is desired the ends of the traces can be forced from the ends of the rod and the horse released under any circumstances.

Figure 1 is a plan view of my invention, and Fig. 2 is an end view.

$a$ represents a common single-tree, upon the rear side of which is loosely secured the detaching-rod $c$, which is made to partially rotate by means of the handle or lever $d$. To the free end of this lever $d$ is fastened a strap or chain, which passes up within easy reach of the occupants of the vehicle.

The two ends of the detaching-rod $c$ pass outward through the ferrules $f$ on the ends of the single-tree, which ferrules are made thickest on their rear sides, and have the holes $e$, as shown in dotted lines in Fig. 1, made through them for the rods. To the outer ends of this rod are secured the auger-shaped tugs $g$, upon which the ends of the traces are fastened, and which tugs are so shaped that when the rod is turned, by pulling upon the handle, the traces will be forced outward until they drop off. Owing to the inclined shape of the tugs, the ends of the traces can be slipped as easily upon them as any other form; but when they are turned forward this inclined shape will force the ends of the traces off under any circumstances.

Each one of the tugs has one of its corners, $i$, elongated into a point, which serves to pass readily through the hole in the trace, and as a guard to prevent the trace from slipping from the tug.

In order to hold up the shafts while getting the horse in position in front of the vehicle, a hook, $h$, is formed on the free end of the lever $d$, which catches in a loop or hook on the front of the vehicle, and thus supports the shafts at a sufficient elevation to allow the horse to be backed under them. This part of my device is a great convenience where there is but a single person to hitch the horse to the vehicle, and especially if the horse is restive.

As the rod $c$ runs along the entire rear edge of the single-tree, it will readily be seen that the tree cannot be broken without bending the rod, and then the parts cannot be separated.

I am aware that a hook has been used for a tug, and which, when turned around, allows the end of the trace to be pulled off, and this I disclaim.

Having thus described my invention, I claim—

1. In a device for detaching horses from vehicles, an auger-shaped tug, substantially as shown.

2. An auger-shaped tug having a point, $i$, on one of its corners, substantially as described.

3. The combination of the detaching-rod $c$, lever $d$, ferrules $f$, having the holes $e$, and auger-shaped tugs $g$, as set forth.

4. The lever $d$, for operating the detaching-rod $c$, provided with the hook $h$, for holding up the shafts, substantially as specified.

In testimony that I claim the foregoing I have hereunto set my hand this 24th day of March, 1879.

ANDREW BUCKLEY.

Witnesses:
FRANK MITCHELL,
RICHD. HIEBER.